(12) United States Patent
Arita et al.

(10) Patent No.: US 7,783,396 B2
(45) Date of Patent: Aug. 24, 2010

(54) HYBRID CRUISING CONTROL SYSTEM

(75) Inventors: Hiroshi Arita, Hitachi (JP); Katsumi Ishikawa, Hitachinaka (JP); Sunao Funakoshi, Kasumigaura (JP); Masahiro Nagasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 12/015,078

(22) Filed: Jan. 16, 2008

(65) Prior Publication Data
US 2008/0183348 A1 Jul. 31, 2008

(30) Foreign Application Priority Data
Jan. 31, 2007 (JP) ............................. 2007-020311

(51) Int. Cl.
G05D 3/00 (2006.01)
G06F 7/00 (2006.01)
(52) U.S. Cl. .............................. 701/22; 701/36; 701/91; 701/93; 475/5; 180/65.28; 180/65.29; 903/903
(58) Field of Classification Search ................... 701/22, 701/36, 91, 96, 99, 93; 475/5; 180/65.25, 180/65.27, 65.28, 65.29; 477/3; 903/903, 903/947
See application file for complete search history.

(56) References Cited

U.S. PATENT DOCUMENTS

| 6,381,522 B1 | 4/2002 | Watanabe et al. |
| 7,013,205 B1 | 3/2006 | Hafner et al. |
| 2002/0107618 A1* | 8/2002 | Deguchi et al. ............... 701/22 |
| 2004/0230376 A1 | 11/2004 | Ichikawa et al. |

FOREIGN PATENT DOCUMENTS

| EP | 1 256 476 A2 | 11/2002 |
| EP | 1 741 591 A1 | 1/2007 |
| JP | 197608 A | 7/2001 |
| JP | 2005-168295 A | 6/2005 |

OTHER PUBLICATIONS

European Search report dated May 30, 2008 (Six (6) pages).

* cited by examiner

*Primary Examiner*—Gertrude Arthur Jeanglaud
(74) *Attorney, Agent, or Firm*—Crowell & Moring LLP (57) ABSTRACT

In a conventional hybrid scheme used to mount a rechargeable battery in a motor vehicle, store into the battery the electric power that has been obtained via a regenerative brake, and utilize the power during acceleration of the vehicle, when a temperature rise of the battery due to charging or discharging causes a temperature of the battery to stay outside a defined range, it has been absolutely necessary to stop the battery charge or discharge, and fuel efficiency has decreased. This invention predicts a charge level and temperature of a rechargeable battery from the cruising input/output power requirements calculated from route information and historical records of cruising, prevents a stoppage of the battery by calculating chronological engine output and brake control data for the temperature to stay within a defined range, and hence improves fuel efficiency.

5 Claims, 8 Drawing Sheets

HYBRID CRUISING CONTROL SYSTEM

BACKGROUND OF THE INVENTION

1. Field of the Invention

The present invention relates to a hybrid cruising control system having a rechargeable battery.

2. Description of the Related Art

In automobiles, railroad vehicles, and the like, a hybrid scheme is known that is used to mount a lead-acid, nickel-metal hydride, lithium-ion, or any other rechargeable battery in the vehicle, store into the rechargeable battery the electric power that has been obtained via a regenerative brake, and utilize the power during the acceleration of the vehicle in order to improve fuel efficiency.

For example, as described in JP-A-2001-197608, a known method of controlling the amount of electric power stored is by obtaining topographical information from a car navigation system or the like and calculating changes in the amount of power storage to make recharging possible for improved fuel efficiency without discarding electric power obtained via a regenerative brake.

In addition, as described in JP-A-2005-168295, since a rechargeable battery has output impedance, the battery generates heat when discharged or recharged. When the temperature of the battery arrives at a predefined value, the discharge or the recharge is stopped to protect the battery. In order to avoid the stops of the discharge and the recharge, a cooling structure of the battery, such as forced air cooling, is considered and increases in the temperature of the battery are suppressed.

SUMMARY OF THE INVENTION

However, the output impedance of rechargeable batteries is not constant and is significantly affected by the state of the battery, especially, deterioration, the battery temperature, and the like, in addition to the amount of electric power stored. Rechargeable batteries also suffer changes in output impedance due to variations in characteristics during manufacturing. Accordingly, there has been the problem that a temperature rise of the rechargeable battery above a predefined value in excess of the cooling performance of the battery renders the discharge or recharge of the battery impossible.

An object of the present invention is to provide a technology for preventing a rechargeable battery state of the power storage device from overstepping a defined range and preventing discharging/recharging of the power storage device from being stopped.

In order to solve the above problem, the present invention provides a hybrid cruising control system including an electric power storage device, an electric motor, an electric power generator, an engine, and braking means. The hybrid cruising control system further includes a function that drives a vehicle by using the motor alone or by using the engine and the motor, brakes the vehicle by regenerative braking with the motor, and causes the electric power storage device to supply electric power to the motor, and a function that stores electric power which the engine has generated by driving the power generator, and regenerative electric power generated by the motor during braking. Additionally, the system has a cruising pattern generator to calculate an output of the engine and a control state of the braking means by using route information and a cruising history, and controls the power storage device such that at least one or more states thereof stay within a required range. Thus, this invention prevents a rechargeable battery state of the power storage device from overstepping a defined range and prevents discharging/recharging of the power storage device from being stopped.

In the pattern generator, it is also possible to avoid rechargeable battery overcharge and overdischarge states by predicting the amount of charging and temperature, and to utilize rechargeable battery capabilities to a maximum thereof by preventing stops of charge and discharge due to increases in temperature.

In addition, in the pattern generator, it is possible to accommodate daily changes in road conditions by collecting historical records of cruising for each day of the week and on a time frame basis.

Furthermore, in the pattern generator, a rechargeable battery state appropriate for the particular road conditions can be controlled to stay within the defined range, by sequentially obtaining information on constantly changing road conditions and cruising conditions, and recalculating chronological engine output and brake control data if actual data measurements prove contrary to initial predictions. Thus, the vehicle can properly behave according to particular cruising conditions such as congestion.

Moreover, in the pattern generator, the rechargeable battery state appropriate for the particular road conditions can be controlled to stay within the defined range, by recalculating chronological engine output and brake control data if a decrease in the charge or discharge level of the battery during a state such as a stop at a traffic signal changes the battery temperature.

Besides, in the pattern generator, if a route change occurs during cruising, the rechargeable battery state appropriate for the particular road conditions can be controlled to stay within the defined range, by recalculating chronological engine output and brake control data based on new route information.

According to the present invention, a rechargeable battery state appropriate for particular road conditions can always be controlled to stay within a defined range, by predicting states of the rechargeable battery in connection with road conditions of a cruising route and precalculating chronological engine output and brake control data. This, in turn, makes it possible to avoid discharge and recharge stoppages of the rechargeable battery, utilize capabilities of the battery to a maximum, and minimize fuel efficiency in the hybrid control system.

In addition, as the cruising route becomes long, fuel efficiency can be improved by collecting route data during cruising and even if actual data measurements prove contrary to initial predictions, conducting re-predictions.

DETAILED DESCRIPTION OF THE PREFERRED EMBODIMENTS

Hereunder, an embodiment of the present invention will be described with reference to the accompanying drawings.

First Embodiment

Figure 1:
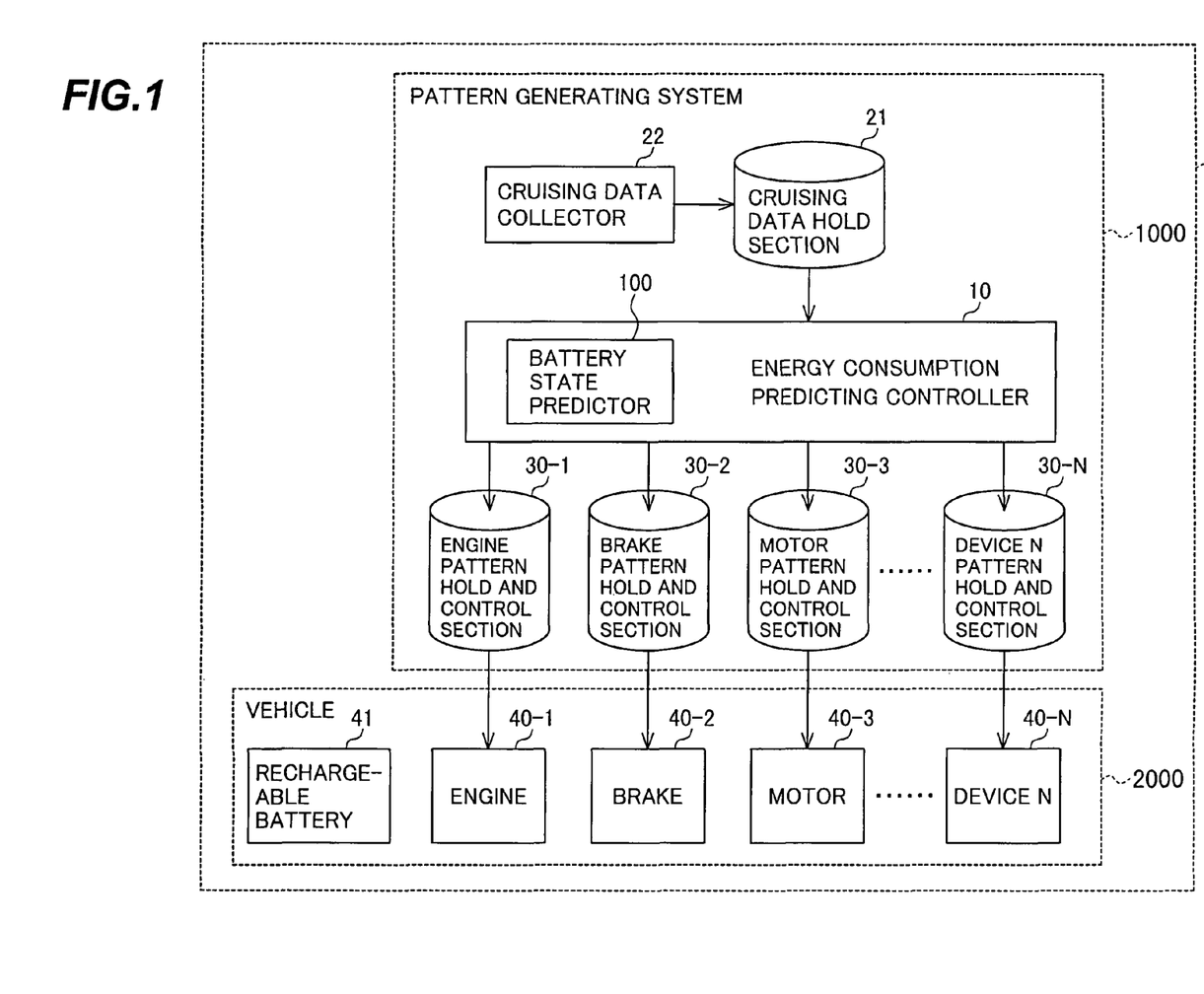
FIG. 1 is a block diagram of a hybrid cruising control system according to the present invention.

An embodiment of a cruising-pattern generating scheme according to the present invention is described below using the accompanying drawings. FIG. 1 shows a block diagram of a hybrid cruising control system 1. The hybrid cruising control system 1 includes a pattern-generating system 1000 and a vehicle 2000. The vehicle 2000 travels in accordance with patterns generated by the pattern-generating system 1000.

The pattern-generating system 1000 includes an energy consumption predicting controller 10 internally having a rechargeable battery state predictor 100. The pattern-generating system 1000 also includes a cruising data hold section 21, a cruising data collector 22, and a pattern hold and control section 30 that holds device patterns.

The vehicle 2000 includes a rechargeable battery 41 and an N number of devices (40-1 to 40-N) such as an engine (for example, internal combustion engine) 40-1, brake 40-2, and motor (an electric motor) 40-3. The engine 40-1 and the motor 40-3 are combined for acceleration, and the brake 40-2 and the motor 40-3 are combined to form a regenerative brake for deceleration (braking). Under these combinations, electric power that has been stored in the rechargeable battery 41 is used by the motor 40-3 during acceleration and up-slope climbing, whereas regenerative electric power that the motor 40-3 has generated is stored into the rechargeable battery 41 during braking and down-slope cruising. In this way, since the regenerative electric power obtained during a decrease in vehicle energy can be used for the battery 41 to increase the vehicle energy, the battery 41 can replace a part of output of the engine 40-1. This improves fuel efficiency.

That is to say, if the energy that the vehicle has is expressed as

Energy of the vehicle=Kinetic energy+Potential energy   Expression (1)

then expression (1) can be rewritten as follows:

Accelerating/up-slope vehicle energy increase: Engine output+Motor output (Discharge of the rechargeable battery)

Decelerating/down-slope vehicle energy decrease: Brake+Motor regenerative energy (Recharge of the rechargeable battery)   Expression (2)

In other words, the discharge and recharge of the rechargeable battery can be controlled by controlling the engine and the brake.

Meanwhile, the rechargeable battery 41 has its limits both on a charge level and on temperature, so the battery needs to be controlled to stay within a required range of charge levels and a required temperature range. Accordingly, if the charge level exceeds an upper limit, charging needs to be stopped, and conversely if the charge level decreases below a lower limit, discharging needs to be stopped. In addition, since the temperature of the battery 41 increases during both charging and discharging, if the battery temperature exceeds an upper limit, charging or discharging needs to be stopped until the battery temperature has decreased sufficiently. The stops of charging and discharging of the battery 41 directly lead to deterioration of fuel efficiency. Cooling performance of the battery 41 is therefore improved by conducting battery structural studies, adopting forced air cooling, and/or the like, to ensure that the temperature of the battery 41 stays within the required range.

Output impedance that causes a temperature rise of the battery 41, however, has the nature that in addition to variations in characteristics during manufacturing, the impedance increases as deterioration progresses. Accordingly, the improvement of the battery in cooling performance alone has had only a limited advantageous effect.

In the present invention, therefore, cruising data appropriate for a current cruising route is retrieved from the cruising data hold section 21, chronological data on the power required for the vehicle 2000 to travel is calculated, and chronological patterns for the engine 40-1 and for the brake 40-2 are generated in accordance with expression (2) so that the charging level and temperature of the battery 41 will stay within the required ranges. Thus, even if the battery 41 varies in characteristics, capabilities thereof can be utilized to their maximum without bringing the battery to a charging or discharging stop due to a temperature rise. This contributes to improving fuel efficiency.

The pattern-generating system 1000 is described below using the accompanying drawings.

Figure 2:
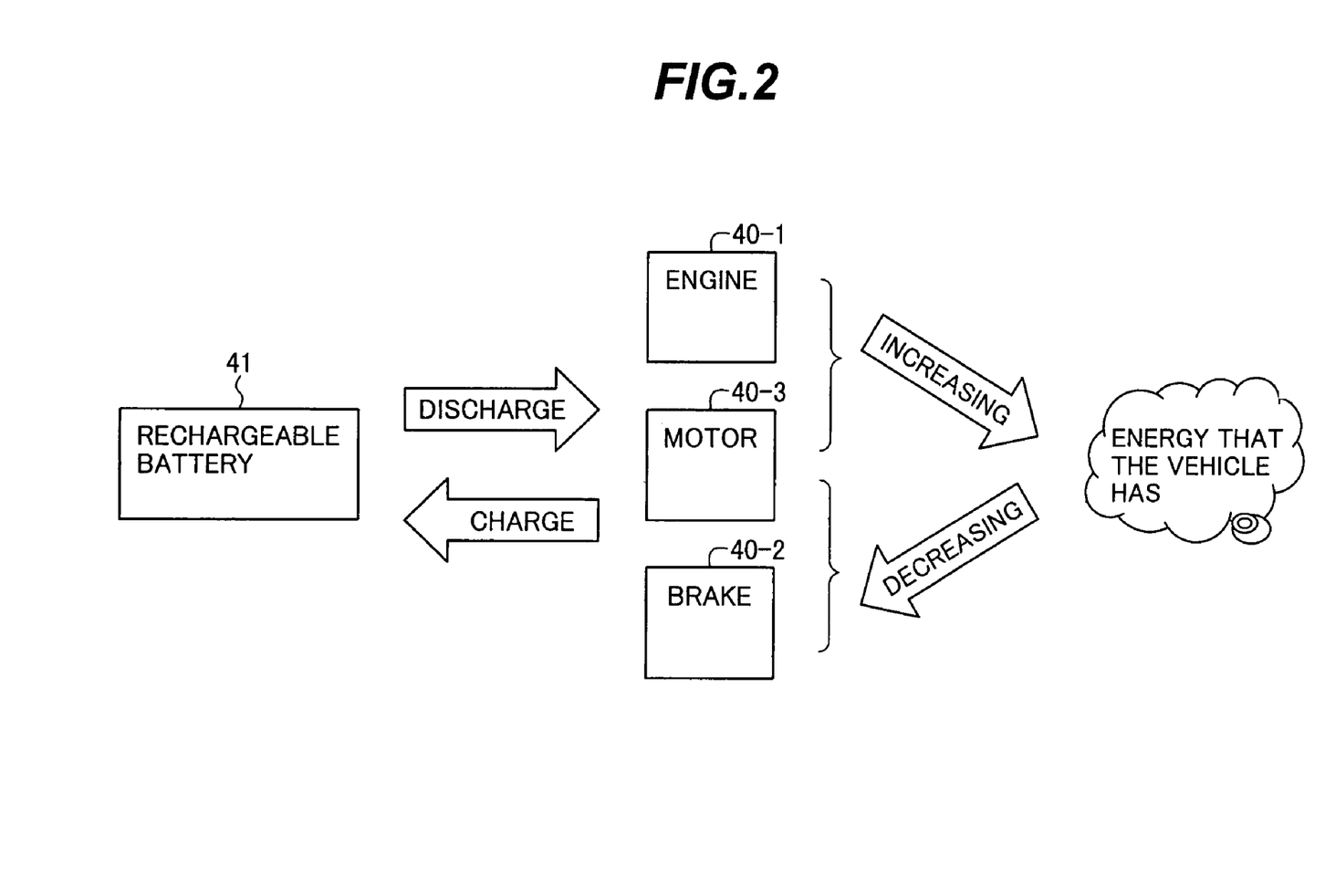
FIG. 2 is a diagram showing a flow of energy in a motor vehicle according to the present invention.
Figure 3:
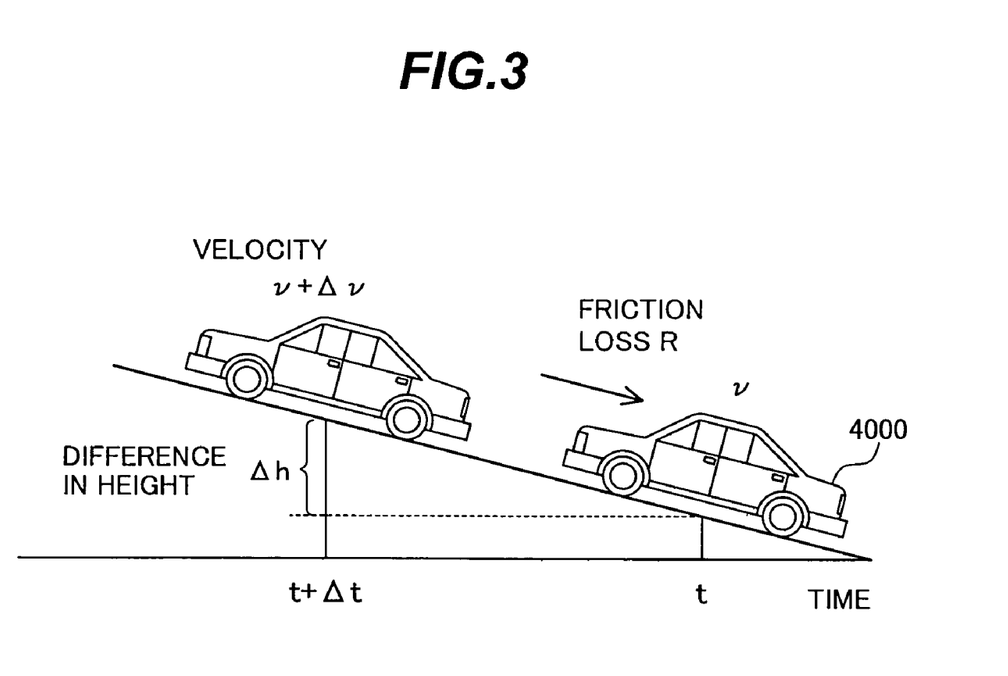
FIG. 3 is a diagram that shows changes in the energy which the vehicle in the invention has.

The cruising data collector 22 detects changes in cruising vehicle energy, and outputs chronological data. More specifically, changes in cruising energy of the vehicle 2000 are as shown in expression (2) and FIG. 2, and these changes can be calculated from inputs and outputs from the engine 40-1, the brake 40-2, and the motor 40-3. In addition, if appropriate cruising data is absent in the cruising data hold section 21, longitudinal surface level information on the cruising route is obtained from cruising route data that has been set in a car navigation system, and a speed change pattern is derived from speed limits, idiosyncratic behaviors of a driver (a person who is driving the vehicle), and selected speed mode. Selectable speed mode is POWER mode, SOFT mode, CITY mode, or the like. If a sampling time interval for the cruising data is taken as $\Delta t$, the cruising data at time "t" (i.e., a change $\Delta E$ in the energy of the vehicle) can be calculated as follows from FIG. 3:

$$\Delta E = \frac{1}{2}m(v+\Delta v)^2 - \frac{1}{2}mv^2 + mg\Delta h + R\Delta t \quad \text{Expression 3}$$
$$= \frac{1}{2}m\Delta v(2v+\Delta v) + mg\Delta h + R\Delta t$$

The cruising data that has thus been obtained is held by the cruising data hold section 21.

In addition, speed change patterns other than those created in the car navigation system can be obtained by accessing a route database present inside or outside the vehicle.

Figure 4:
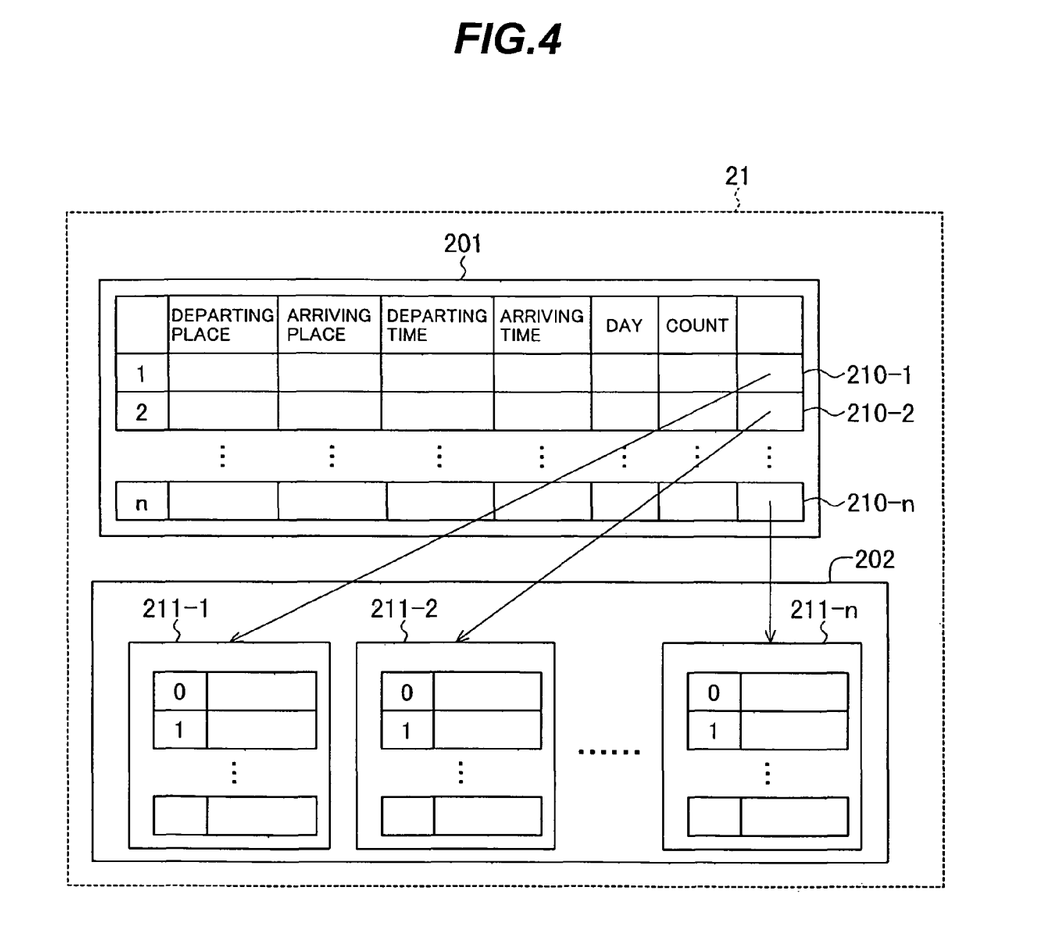
FIG. 4 is a block diagram of a cruising data hold section according to the present invention.

A configuration of the cruising data hold section 21 is shown in FIG. 4. The cruising data hold section 21 includes a cruising data table 201 and a cruising data group 202. In addition to a departing place, an arriving place, time of the day, and a day of the week, a cruising count flag indicating how many times the vehicle has traveled on the route (0: provisional cruising data based on the information obtained from the car navigation system or the like, 1 or more: count of cruises on the route), and a pointer to a cruising data series 211 are held on each line 210 of the cruising data table 201. The cruising data group 202 is formed up of a plurality of cruising data series 211, and each cruising data series 211 is formed of a series of the vehicle energy changes which have been sampled at the foregoing sampling time interval Δt.

Update sequences relating to the cruising data table 201 and the cruising data series 211 are described below.

Before the route is cruised for the very first time, provisional cruising data is created from the topographical information obtained from the car navigation system, the route database, and/or the like, and then the created provisional cruising data is registered in the cruising data table 201 and the cruising data group 202. After this, when the cruise is started, updating of the cruising data group 202 into cruising data output from the cruising data collector 22 is started. If 0 is set up in the cruising count flag of the cruising data table 210, since the cruising data is the provisional cruising data that has been created from the car navigation system and/or the like, the provisional cruising data is overwritten with the cruising data output from the cruising data collector 22. If 1 or more is set up in the cruising count flag, since the vehicle has already traveled in the past, the cruising data is updated by statistical processing such as averaging.

Description of the energy consumption predicting controller 10 now follows.

Figure 5:
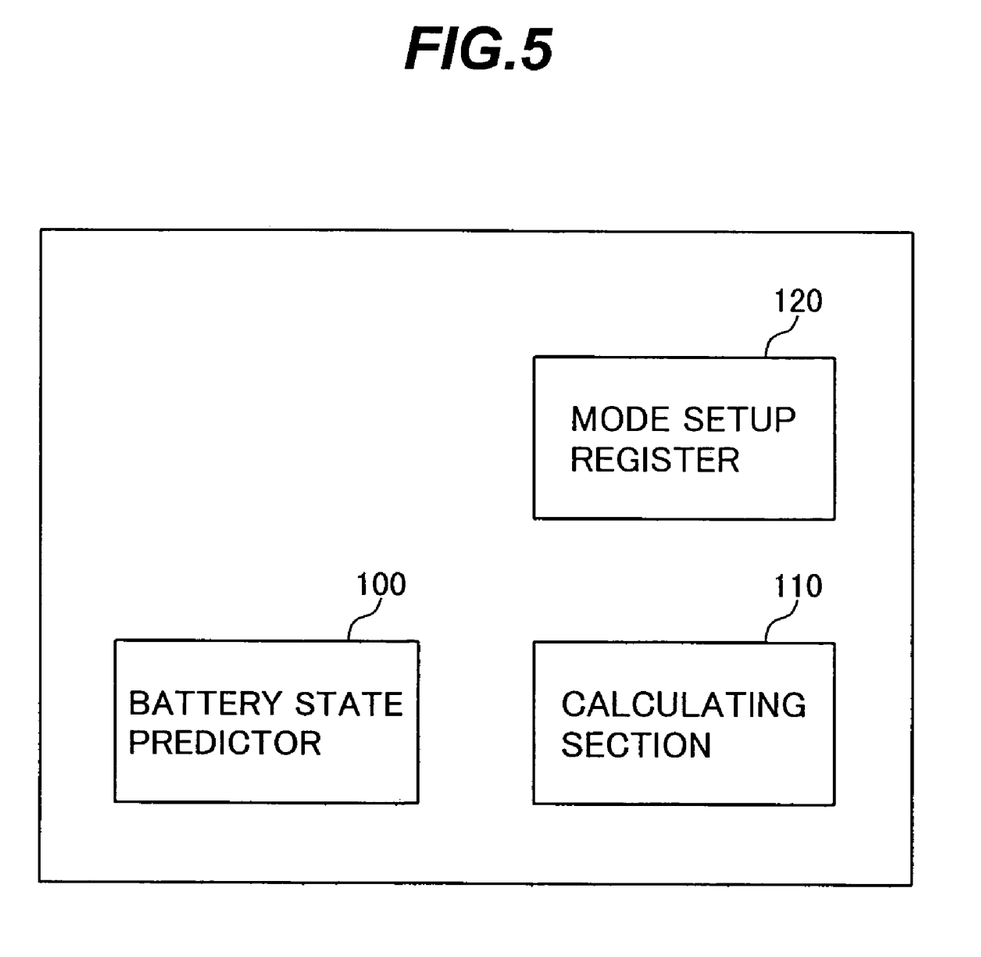
FIG. 5 is a block diagram of an energy consumption predicting controller according to the present invention.

FIG. 5 shows a configuration of the energy consumption predicting controller 10 includes a calculating section 110, a mode setup register 120, and a rechargeable battery state predictor 100. The calculating section 110 that undertakes processing of the energy consumption predicting controller 10, obtains cruising data from the cruising data hold section 21, and generates a pattern to be output to the pattern hold section 30. The mode setup register 120 includes a mode setup register of the calculating section 110. The rechargeable battery state predictor 100 predicts the charge level and temperature of the rechargeable battery from a battery discharge/recharge pattern created by the calculating section 110.

Figure 6:
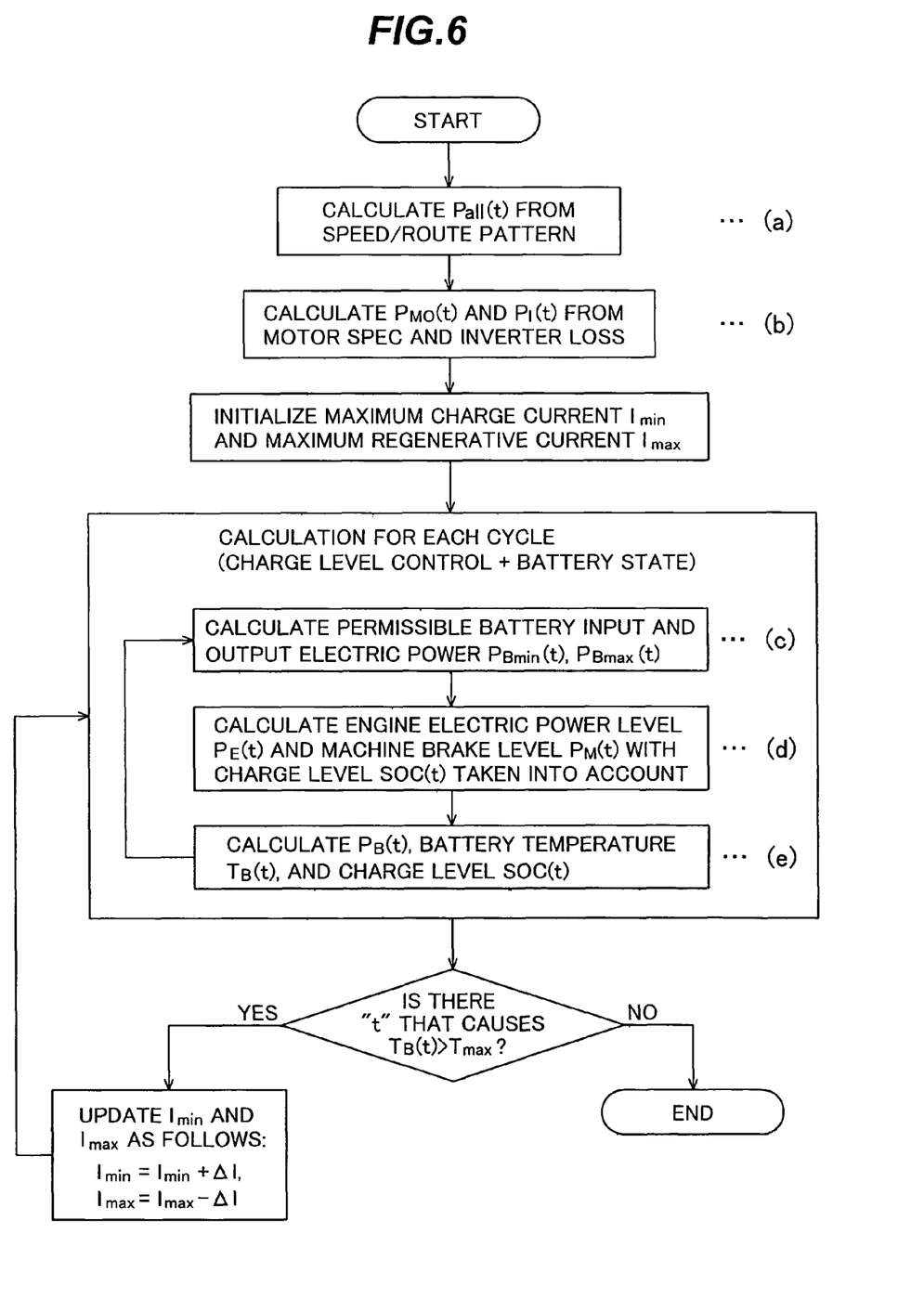
FIG. 6 shows an algorithm of device pattern generation by a calculating section according to the present invention.

An algorithm of pattern generation by the calculating section 110 is shown in FIG. 6. Process steps (a) to (e) are described below. Steps (a) and (b) relate to initialization, and steps (c), (d), and (e) relate to pattern generation for each cycle. If the battery temperature $T_B$ oversteps a required range, a maximum recharging/discharging current $I_{min}$, $I_{max}$ of the battery 41 is reviewed and calculation of each pattern is repeated.

a) Obtain Cruising Data Series $P_{all}(t)$

Cruising route information is obtained from the car navigation system, the route database, or the like, and appropriate cruising data is read out from the cruising data hold section 21. At this time, if the appropriate cruising data is absent in the cruising data hold section 21, the cruising data collector 22 is requested to create provisional cruising data in accordance with a mode setting of the mode setup register 120 or the system operates in accordance with a selected battery usage mode.

b) Calculate Input/Output Electric Power $P_I(t)$ with Respect to the Motor 40-3 and an Initial Brake Control Level $P_{Mo}(t)$ of the Brake 40-2

Figure 7:
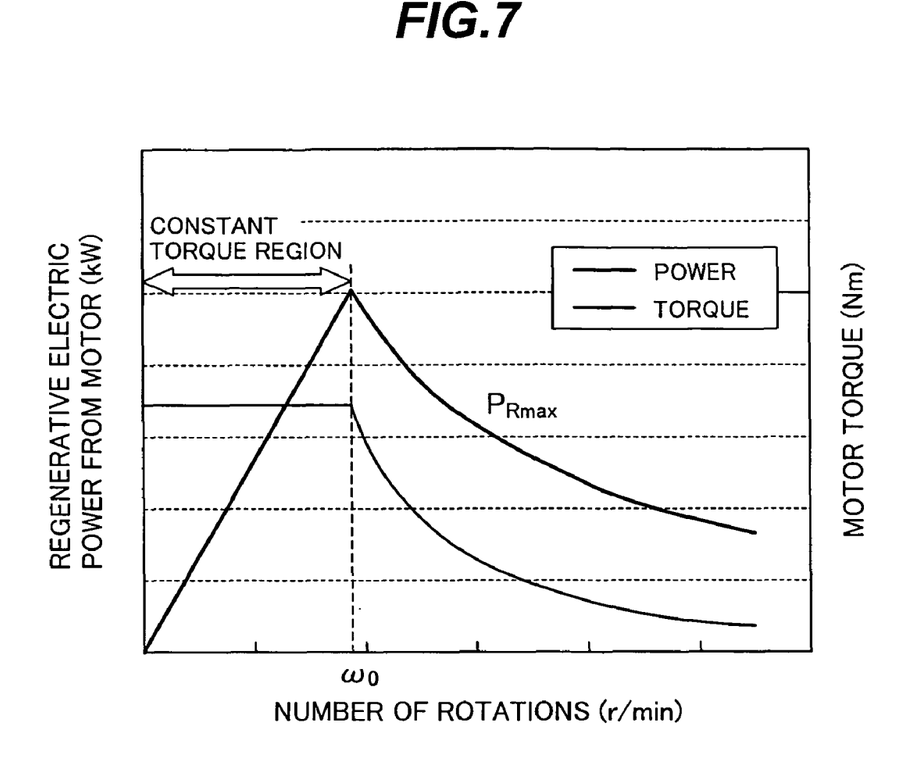
FIG. 7 is a diagram that shows regenerative brake motor spec.

The input/output energy $P_I(t)$ of the motor 40-3 and the brake control level $P_{Mo}(t)$ of the brake 40-2 are calculated with motor spec and loss incorporated with respect to the cruising data series $P_{all}(t)$. The motor 40-3 has such characteristics as shown in FIG. 7, and when the number of rotations oversteps a fixed torque domain, the motor decreases in output/regenerative power. Accordingly, if $P_{all}(t)$ exceeds energy $P_{Rmax}(t)$ that the motor 40-3 can regenerate, the difference requires compensation with the brake 40-2. A brake control level associated with the compensation is represented as $P_{Mo}(t)$, which is shown in expression (4). Also, a calculation expression for the input/output power of the motor 40-3 is shown in FIG. (5), where $\eta_I$ denotes conversion efficiency of the motor power.

$$P_{M0}(t) = \begin{cases} -P_{Rmax} - P_{all}(t) & \text{if } P_{all}(t) < -P_{Rmax} \\ 0 & \text{others} \end{cases} \quad \text{Expression 4}$$

Beware that during regenerative braking, $P_{all}(t)<0$ holds in expression (4).

$$P_I(t) = \begin{cases} P_{all}(t)/\eta_I & \text{if } P_{all}(t) \geq 0 \text{(output)} \\ \eta_I(P_{all}(t) - P_{M0}(t)) & \text{others(regeneration)} \end{cases} \quad \text{Expression 5}$$

c) Calculate Permissible Input/Output Power $P_{Bmin}(t)$, $P_{Mmax}(t)$ of the Battery 41

Figure 8:
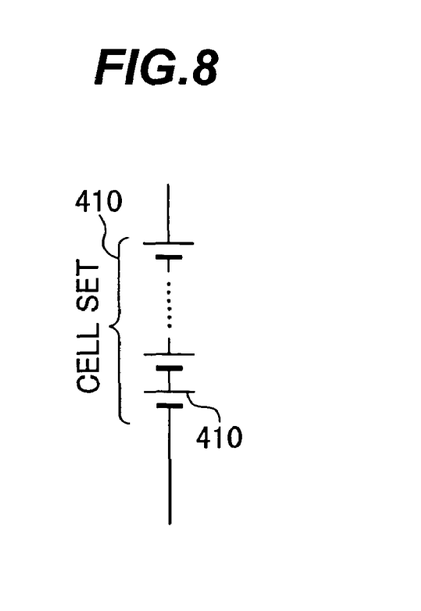
FIG. 8 is a diagram showing a configuration of a rechargeable battery according to the present invention.
Figure 9:
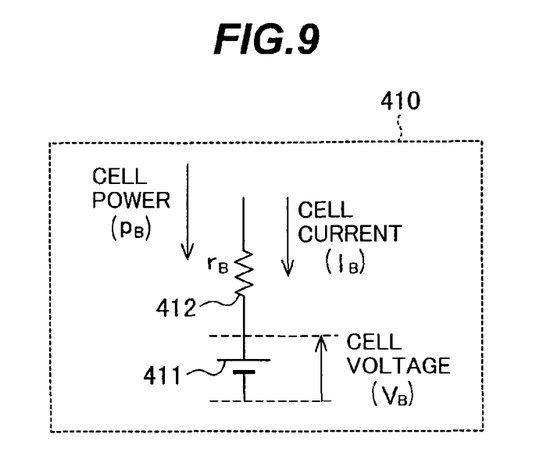
FIG. 9 is a diagram showing a configuration of cells which constitute the rechargeable battery.
Figure 10:
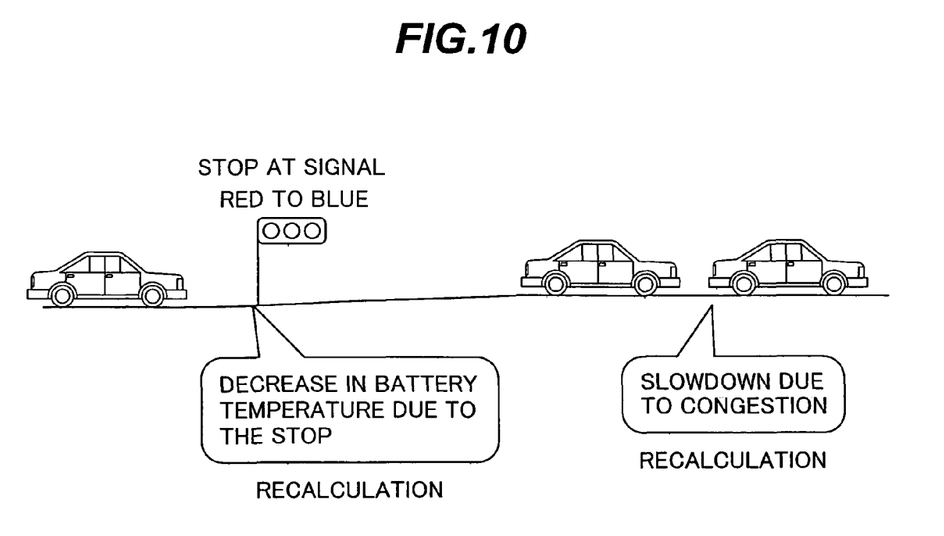
FIG. 10 is a diagram that shows timing in which a pattern is generated for each device.

As shown in FIG. 8, the rechargeable battery 41 is of a cell set configuration with a plurality of cells 410. For simplicity in the description given herein, it is assumed that each cell is uniform in quality (each cell is equal in voltage, current, and output impedance), and calculations are conducted on a cell-by-cell basis. FIG. 9 shows a cell model. The cell 410 includes an output impedance element 412 and a pure cell 411. An expression for calculating the maximum and minimum electric power levels $P_{Bmin}(t)$, $P_{Mmax}(t)$ that the battery can input and output (i.e., permissible input/output power levels) are shown as expression (6), where N denotes the number of cells and $V_B(t)$, $r_B(t)$ denotes the cell voltage, output impedance.

$$P_{Bmin}(t) = N\{V_B(t) \times I_{Bmin} + r_B(t)I_{Bmin}^2\}$$
$$P_{Bmax}(t) = N\{V_B(t) \times I_{Bmax} - r_B(t)I_{Bmax}^2\} \quad \text{Expression 6}$$

Since $V_B(t)$, $r_B(t)$ depends on the charge level SOC(t) and temperature $T_B(t)$ of the battery, $V_B(t)$, $r_B(t)$ is calculated from the SOC(t), $T_B(t)$ calculated in the previous cycle.

d) Calculate the Output $P_E(t)$ of the Engine 40-1 and the Control Level $P_M(t)$ of the Brake 40-2

From expression (2), a relationship between $P_E(t)$, $P_B(t)$, and $P_M(t)$ is as shown in FIG. (7). Total electric power required for all devices 40, except for the engine 40-1 and the brake 40-2, is taken as $P_s(t)$.

$$P_B(t)=P_E(t)-(P_I(t)+P_S(t)+P_M'(t)) \text{ where}$$
$$P_M'(t)=\eta_I(P_M(t)-P_{M0}(t)) \quad \text{Expression 7}$$

The engine output $P_E(t)$ and the braking level $P_M(t)$ are calculated from $P_{Bmin}(t)$, $P_{Bmax}(t)$ and the SOC(t) calculated in the previous cycle. During output, the battery 41 is power-assisted by the engine 40-1, and during regenerative braking, by the brake 40-2. In addition, in order that the charge level SOC(t) of the battery 41 will stay within the required range, $P_B(t)<0$ (discharging only) holds if SOC(t)>$SOC_{max}$, and $P_B(t)>0$ (recharging only) holds if SOC(t)<$SOC_{min}$. An expression for calculating $P_E(t)$ is shown as expression (8), and an expression for calculating $P_M(t)$ is shown as expression (9).

When if $P_I(t) + P_S(t) \geq 0$      Expression 8

$$P_E(t) \geq \begin{cases} P_I(t) + P_S(t) & \text{if } SOC(t) < SOC_{min} \\ P_{Bmin}(t) + P_S(t) + P_I(t) & \text{others} \end{cases}$$

$$P'_M(t) = 0$$

When others (if $P_I(t) + P_S(t) < 0$)      Expression 9

$$P'_M(t) = \begin{cases} -(P_I(t) + P_S(t)) & \text{if } SOC(t) > SOC_{max} \\ -(P_{Bmax}(t) + P_S(t) + P_I(t)) & \text{others} \end{cases}$$

$$P_E(t) = 0$$

where $P_E(t) \geq 0$, $P'_M(t) \geq 0$ e) Calculate the Charge Level SOC(t) and Temperature $T_B(t)$ of the Battery 41

As with the $P_{Bmin}(t)$, $P_{Bmax}(t)$ of (c), the charge level SOC(t) and the temperature $T_B(t)$ are calculated for each cell. An expression for calculating the input/output energy $P_B(t)$ of the battery from expressions (6), (7), (8) and then calculating the cell current $I_B(t)$ in accordance with the cell model shown in FIG. 9 is shown as expression (10). A change in charge level and the amount of heat generated are calculable from $I_B(t)$. An expression for calculating the charge level SOC(t) is shown as expression (11), and an expression for calculating the temperature $T_B(t)$ is shown as expression (12). Each module has a cooling fan to conduct forced air cooling.

From $(V_B(t) + r_B(t)I_B(t)) \times I_B(t) = \frac{P_B(t)}{N} P_B(t)$      Expression 10

$$I_B(t) = \frac{-V_B(t) + \sqrt{V_B(t)^2 + 4r_B(t)P_B(t)}}{2r_B(t)}$$

$$\frac{dSOC(t)}{dt} = \frac{I_B(t)}{k_B}$$      Expression 11

$$\theta_B \frac{dT_B(t)}{dt} = r_B(t)I_B(t)^2 - k_T f_B(T_B(t) - T_a)$$      Expression 12 where $K_B$ denotes a total charge quantity stored within the battery 41 when the charge level SOC(t) is equal to 100 percent, $r_B(t)$ the output impedance of the battery 41, $\theta_B$ a heat capacity of the battery 41, $k_T$ a cooling coefficient, $f_B$ a cooling air velocity, and $T_a$ a cooling air temperature.

The engine pattern 30-1{$P_E(t)$} and the brake pattern {$P_M(t)$} can be calculated from the above steps.

In addition, recalculations are conducted in this algorithm if a work-associated route change or speed change, traffic congestion, or a stop of the vehicle at a signal deviates the battery temperature from a predicted pattern. Furthermore, predicting an average speed by use of VISC information or other congestion information makes it possible to repeat state calculations of the battery 41 and properly control the battery state according to a particular situation, even in case of an unpredictable event such as accident congestion. Thus, the rechargeable battery 41 can always be maintained in a usable condition thereof.

Moreover, in addition to a vehicle of the above-described configuration, the present embodiment can be applied to a vehicle having a function that supplies engine-generated electric power directly to a motor without storing the power into a storage battery.

Besides, in the above embodiment, the pattern-generating system 1000 and the vehicle 2000 do not always need to be accommodated together in one enclosure. A similar configuration and like advantageous effects can be obtained by arranging the pattern-generating system 1000 and the vehicle 2000 in different remote places and connecting both via a communications line.

According to the hybrid control system of the present invention that has a mounted rechargeable battery, it becomes possible, by predicting from a predicted cruising pattern the charge level and temperature indicating the battery state, to avoid overcharge and undercharge, especially a state in which a temperature rise renders the battery unusable, fully utilize the capabilities of the battery, and contribute to improving fuel efficiency.

What is claimed is:

1. A hybrid cruising control system, comprising:
   an electric power storage device;
   an electric motor;
   an electric power generator;
   an engine; and
   braking means; wherein,
   a motor vehicle is driven by said motor alone or by using said engine and said motor, the vehicle being braked by regenerative braking with said motor alone or by combining said braking means and regenerative braking with said motor;
   said electric power storage device has a function which supplies electric power to said motor, and a function which stores, in addition to electric power which said engine has generated by driving said electric power generator, regenerative electric power generated by said motor during braking;
   means for generating a cruising pattern is provided for calculating an output of said engine and a control state of said braking means by using route information and historical records of cruising;
   said electric power storage device is controlled such that at least one or more states thereof will stay within a required range; and
   the means for generating a cruising pattern predicts a charge level and temperature as states of said electric power storage device.

2. The hybrid cruising control system according to claim 1, wherein the means for generating a cruising pattern accommodates daily changes in route conditions by collecting historical records of cruising for each specific day of the week and on a specific time frame basis.

3. The hybrid cruising control system according to claim 1, wherein:
   the means for generating a cruising pattern obtains information on sequential cruising route conditions and cruising conditions to cope even with traffic congestion, blockage, and other unassumed cruising conditions; and
   if actual data measurements prove contrary to initial predictions, the means for generating a cruising pattern regenerates a cruising pattern.

4. The hybrid cruising control system according to claim 1, wherein when a cruising route change occurs, the means for generating a cruising pattern regenerates a cruising pattern for the new route, based on route information and historical records of cruising.

5. The hybrid cruising control system according to claim 1, wherein the means for generating a cruising pattern regenerates a cruising pattern if a temperature of the battery is reduced as a result of a stop at a signal.

\* \* \* \* \*